(12) United States Patent
Takeyama

(10) Patent No.: US 9,121,370 B2
(45) Date of Patent: Sep. 1, 2015

(54) COMBUSTION SYSTEM

(71) Applicant: DENSO CORPORATION, Kariya, Aichi-pref. (JP)

(72) Inventor: Masaki Takeyama, Okazaki (JP)

(73) Assignee: DENSO CORPORATION, Kariya (JP)

( * ) Notice: Subject to any disclaimer, the term of this patent is extended or adjusted under 35 U.S.C. 154(b) by 92 days.

(21) Appl. No.: 13/849,777

(22) Filed: Mar. 25, 2013

(65) Prior Publication Data

US 2014/0283762 A1    Sep. 25, 2014

(30) Foreign Application Priority Data

Nov. 15, 2011   (JP) .................................. 2011-249239
Nov. 15, 2011   (JP) .................................. 2011-249240

(51) Int. Cl.
*F02M 27/02*   (2006.01)
*F02D 13/02*   (2006.01)

(52) U.S. Cl.
CPC ........... *F02M 27/02* (2013.01); *F02D 13/0203* (2013.01)

(58) Field of Classification Search
CPC ........... F02D 13/0242; F02D 13/0249; F01N 3/00–3/02; F02B 51/00–51/02; F02M 27/00–27/02
USPC .................... 123/1 A, 2, 568.11; 60/317, 320
See application file for complete search history.

(56) References Cited

U.S. PATENT DOCUMENTS

| | | | |
|---|---|---|---|
| 4,059,076 A * | 11/1977 | Kosaka et al. | 123/3 |
| 4,430,856 A | 2/1984 | Niedert | |
| 8,596,231 B2 * | 12/2013 | Shimada et al. | 123/58.8 |
| 8,869,754 B2 * | 10/2014 | Shimada et al. | 123/3 |
| 2011/0265736 A1 | 11/2011 | Shimada et al. | |
| 2012/0145096 A1 * | 6/2012 | Shimada et al. | 123/3 |

FOREIGN PATENT DOCUMENTS

| | | | | |
|---|---|---|---|---|
| JP | 57191446 A | * 11/1982 | | F02M 33/00 |
| JP | S58-091349 | 5/1983 | | |

(Continued)

OTHER PUBLICATIONS

Machine translation of Detailed Description, Nagano, S., JP2008-014138, pp. 1-18.*

(Continued)

*Primary Examiner* — Lindsay Low
*Assistant Examiner* — Grant Moubry
(74) *Attorney, Agent, or Firm* — Nixon & Vanderhye P.C.

(57) ABSTRACT

A combustion system includes a reformer reforming a fuel on a catalyst to increase a combustion energy generated by the fuel per unit quantity of the fuel. The system includes an injection unit injecting a reformed fuel and a non-reformed fuel in such a manner that the reformed fuel is annularly distributed along an inner circumferential wall of a cylinder and the non-reformed fuel is distributed inside of the annularly distributed reformed fuel. The reformed fuel and the non-reformed fuel are combusted in a combustion chamber of the internal combustion engine at a substantially same time. The reformed fuel is annularly distributed along an inner circumferential wall of an internal combustion engine. The non-reformed fuel is distributed in a center portion of the annularly distributed reformed fuel. The non-reformed fuel is compressed self-ignited to be combusted and the reformed fuel is ignited by a combustion of the non-reformed fuel.

10 Claims, 7 Drawing Sheets

(56) References Cited

FOREIGN PATENT DOCUMENTS

| JP | 2004-190586 | 7/2004 |
| JP | 2008-14138 | 1/2008 |
| JP | 2010-007612 | 1/2010 |
| JP | 2010-190043 | 9/2010 |
| JP | 2010-190110 | 9/2010 |
| JP | 2010-242683 | 10/2010 |
| JP | 2011-21564 | 2/2011 |

OTHER PUBLICATIONS

Machine translation of Detailed Description, Kasai et al., JP2010-190043, pp. 1-17.*
Machine translation of Detailed Description, Nakada, I., JP2010-242683, pp. 1-11.*
Machine translation of Detailed Description, Shinjo et al., JP2010-190110, pp. 1-12.*
Machine translation of Detailed Description, Moriyoshi et al., JP2011-021564, pp. 1-29.*
Office Action (2 pages) dated May 7, 2014, issued in corresponding Japanese Application No. 2011-249239 and English translation (2 pages).
Office Action (2 pgs.) dated Nov. 27, 2013 issued in corresponding Japanese Application No. 2011-249239 with an at least partial English language translation thereof (2 pgs.).
Office Action (2 pgs.) dated Nov. 27, 2013 issued in corresponding Japanese Application No. 2011-249240 with an at least partial English language translation thereof (2 pgs.).

* cited by examiner

COMBUSTION SYSTEM

CROSS-REFERENCE TO RELATED APPLICATION

This application is based on Japanese Patent Applications No. 2011-249240 filed on Nov. 15, 2011, and No. 2011-249239 filed on Nov. 15, 2011, the disclosures of which are incorporated herein by reference.

TECHNICAL FIELD

The present disclosure relates to a combustion system in which reformed fuel is combusted in a combustion chamber of an internal combustion engine.

BACKGROUND

JP-2004-190586A describes a combustion system in which fuel is reformed by a catalyst of a reformer and the reformed fuel is injected into an intake pipe to be combusted in a combustion chamber. A combustion energy is increased and a fuel economy can be improved.

In the above combustion system, an ignition-type engine is used. When the combustion becomes unstable at a starting of the engine, a port injection is conducted to ignite the fuel. At the times other than the starting of the engine, the fuel is reformed to improve self-ignitionability thereof. The reformed fuel time is directly injected into a combustion chamber to be self-ignited. Non-reformed fuel which has not been reformed is also injected into the combustion chamber through an intake port. The reformed fuel and the non-reformed fuel are combusted at the same time. The reformed fuel flows through an intake pipe and is mixed with a fresh intake air to be cooled. In a case that ambient temperature is low and temperature of the reformed fuel supplied to a reformer is low, an ignitionability may be deteriorated.

In the above conventional combustion system, the fuel is reformed in order to improve the self-ignitionability. Meanwhile, the present inventor studied about the reformed fuel in order to increase the combustion energy of the fuel per unit quantity so that the fuel economy is improved.

For example, alcohol fuel ($CH_3$—OH), such as methanol and ethanol, is reacted to water ($H_2$) on a catalyst, whereby the fuel is changed into hydrogen ($H_2$) and carbon monoxide (CO). Such hydrogen and carbon monoxide are combusted as the reformed fuel.

However, according to the inventor's study, when the above fuel reform is conducted to improve the combustion energy, the self-ignitionability is deteriorated. It is becomes difficult to perform a compression self-ignition combustion of the reformed fuel.

SUMMARY

The present invention is made in view of the above matters, and it is an object of the present invention to provide a combustion system which can restrict a decreased of a temperature of the reformed fuel. Further, the combustion system can reform fuel without deteriorating a self-ignitionability thereof and can reduce heat loss that combustion heat energy is lost from a cylinder wall surface.

A combustion system includes a reformer which reforms a fuel on a catalyst so as to increase a combustion energy generated by the fuel per unit quantity of the fuel; and an injection unit which injects a reformed fuel and a non-reformed fuel in such a manner that the reformed fuel is annularly distributed along an inner circumferential wall of a cylinder of an internal combustion engine and the non-reformed fuel is distributed inside of the annularly distributed reformed fuel.

The reformed fuel and the non-reformed fuel are combusted in a combustion chamber of the internal combustion engine at a substantially same time, and the non-reformed fuel is compressed self-ignited to be combusted and the reformed fuel is ignited by a combustion of the non-reformed fuel.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
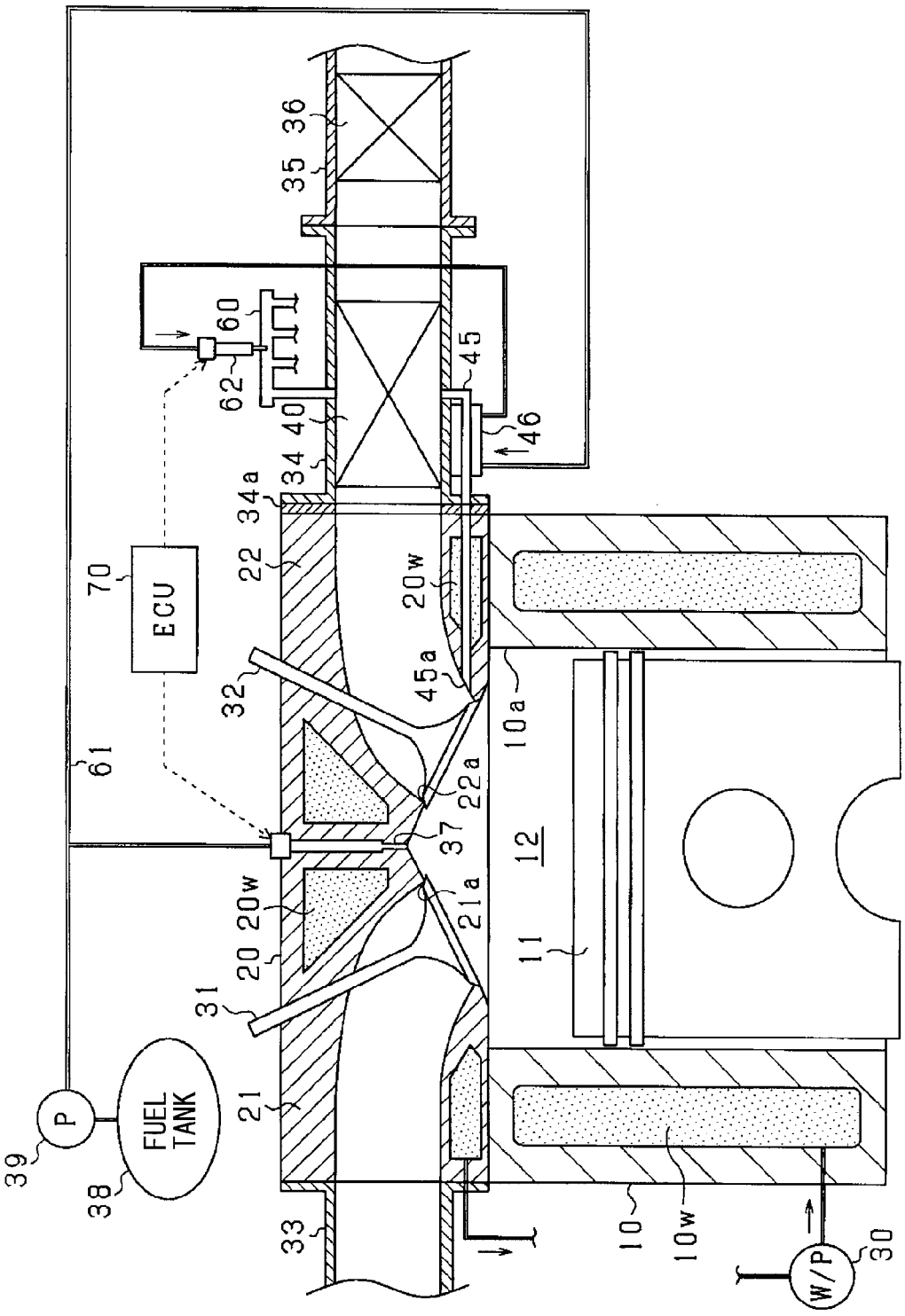
FIG. 1 is a chart schematically showing a combustion system according to a first embodiment.

Hereinafter, embodiments of the present invention will be described. The same parts and components as those in each embodiment are indicated with the same reference numerals and the same descriptions will not be reiterated.

[First Embodiment]

According to a first embodiment, a combustion system is applied to a stationary-type internal combustion engine, which functions as a driving source of an electric generator.

As shown in FIG. 1, the internal combustion engine is a multi-cylinder engine having multiple cylinders. These cylinders are defined by a cylinder head 20 and a cylinder block 10. The cylinder block 10 defines a combustion chamber 12 in which a piston 11 reciprocates. Moreover, water jackets 10w, 20w are defined in the cylinder block 10 and the cylinder head 20. Engine coolant discharged from a water pump 30 circulates through the water jackets 10w, 20w, whereby the cylinder block 10 and the cylinder head 20 are cooled. It should be noted that the water pump 30 may be a mechanical pump driven by the internal combustion engine or an electric pump driven by an electric motor.

The cylinder head 20 has an intake port 21 and an exhaust port 22. An intake inlet 21a of the intake port 21 is opened and closed by an intake valve 31, and an exhaust outlet 22a of the exhaust port 22 is opened and closed by an exhaust valve 32. An intake manifold 33 which distributes fresh air into each cylinder is connected to the intake port 21.

An exhaust manifold 34 (exhaust pipe) is connected to the exhaust port 22. A heat insulating material 34a is disposed between the exhaust port 22 of the cylinder head 20 and the exhaust manifold 34. Moreover, a collecting exhaust pipe 35 (exhaust pipe) is connected to a downstream of the exhaust manifold 34. A purifying device 36 which purifies NOx, HC, CO, etc. in exhaust gas is arranged in the collecting exhaust pipe 35.

A fuel injector 37 is provided to the cylinder head 20 with respect to each cylinder. Liquid fuel stored in a fuel tank 38 is pressure-fed to the fuel injector 37 by the fuel feed pump 39. When the fuel injector 37 is opened, the liquid fuel is directly injected into the combustion chamber 12. It should be noted that above-mentioned liquid fuel is alcohol (for example, methanol $CH_3$—OH). Furthermore, a part of the fuel supplied from the fuel feed pump 39 is reformed by a reformer 40. The reformed fuel is injected into the exhaust port 22, and then flows into the combustion chamber 12 through the exhaust port 22.

As above, air-fuel mixture of non-reformed fuel injected by the fuel injector 37 and intake air flowing through the intake port 21 is adiabatically compressed to be self-ignited in the combustion chamber 12. The non-reformed fuel is the alcohol fuel which has not been reformed by the reformer 40. Meanwhile, air-fuel mixture of the reformed fuel flowing into the combustion chamber 12 through the exhaust port 22 and the fresh air flowing into the combustion chamber 12 through the intake port 21 is ignited and combusted when the non-reformed fuel is self-ignited. That is, since a self-ignition temperature of the non-reformed fuel is lower than that of the reformed fuel, the non-reformed fuel tends to be self-ignited easier than the reformed fuel. Meanwhile, a minimum energy necessary for the reformed fuel to be ignited is smaller than that for the non-reformed fuel. According to the present embodiment, the non-reformed fuel is self-ignited first and then the reformed fuel is combusted.

Figure 2:
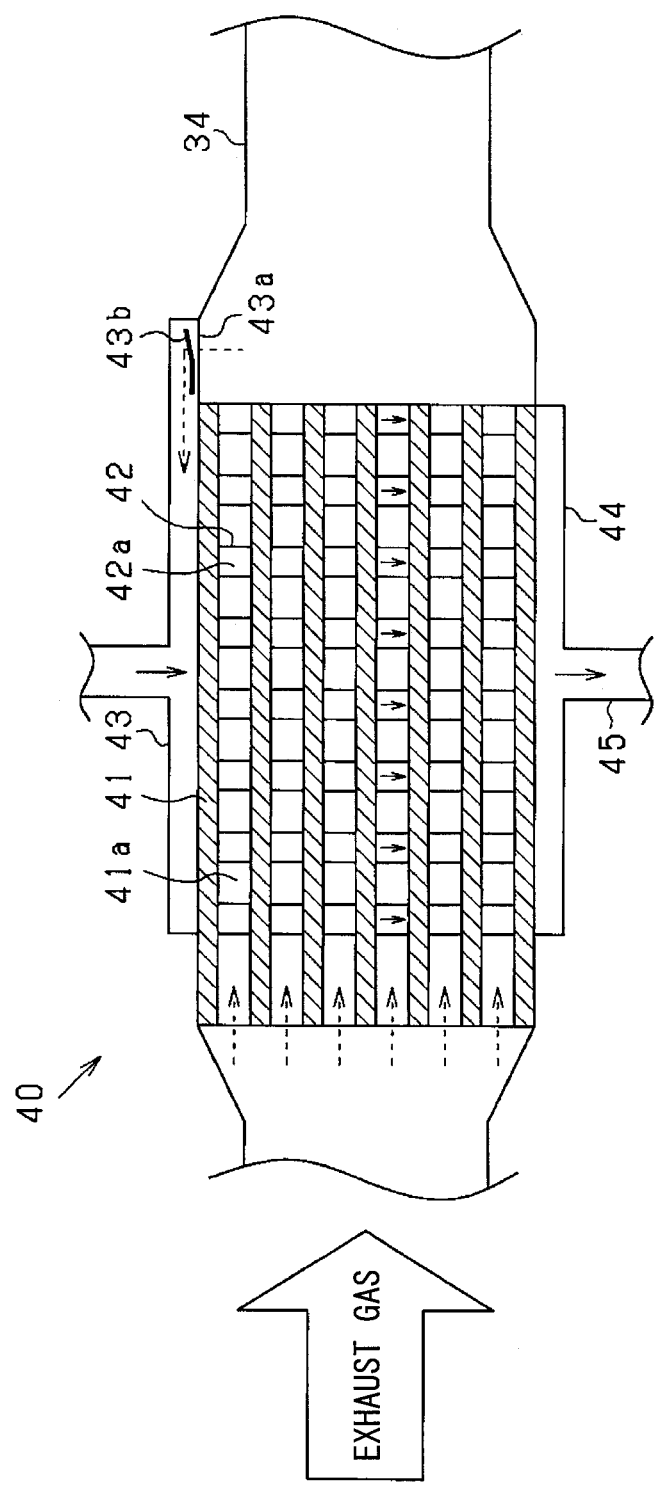
FIG. 2 is a chart showing a configuration of a reformer in detail according to the first embodiment.

The reformer 40 is arranged inside of the exhaust manifold 34. Referring to FIG. 2, a configuration of the reformer 40 will be described.

The reformer 40 is provided with a wall 41 defining an exhaust passage 41a and a pipe 42 defining a fuel passage 42a. A catalyst is supported on an inner surface of the pipe 42. The wall 41 is made from ceramics of which performance of heat insulation is higher than metal. As shown by dashed-line arrows, the exhaust gas flowing through the exhaust passage 41a heats the catalyst, so that temperature of the catalyst becomes more than activation temperature. Further, as shown by solid-line arrows, the exhaust gas heats the fuel flowing through the fuel passage 42a.

The reformer 40 is provided with a header pipe 43 which distributes the fuel to each of the fuel passages 42a and a footer pipe 44 in which the fuel is converged from the fuel passages 42a. It should be noted that the reformer 40 is provided to each cylinder and the fuel is supplied to the header pipe 43 from a distribution pipe 60.

The header pipe 43 has an inlet port 43a through which the exhaust gas flows thereinto. A reed valve 43b (check valve) is provided to the inlet port 43a. Thereby, the exhaust gas flows into the fuel in the header pipe 43. On the catalyst disposed inner surface of the pipe 42, the liquid fuel (methanol $CH_3$—OH) supplied from the header pipe 43 reacts with water contained in the exhaust gas, whereby the liquid fuel is reformed into hydrogen ($H_2$) and carbon monoxide (CO). That is, hydrogen and carbon monoxide are the reformed fuel, which flows into the combustion chamber 12 through the exhaust port 22.

A reformed-fuel pipe 45 is connected to the footer pipe 44. The reformed fuel flows through the reformed-fuel pipe 45 toward the exhaust outlet 22a of the exhaust port 22. A part of the reformed-fuel pipe 45 is inserted into the cylinder head 20. A downstream opening end 45a of the reformed-fuel pipe 45 is arranged in vicinity of the exhaust outlet 22a. Therefore, the fuel reformed by the reformer 40 flows through the reformed-fuel pipe 45 to be injected into a vicinity of the exhaust outlet 22a.

As shown in an FIG. 1, the fuel pressure-fed from the fuel feed pump 39 flows through a branch pipe 61 and is supplied to a supply valve 62 provided to the distribution pipe 60. Therefore, when the supply valve 62 is opened, the fuel pressure-fed from the fuel feed pump 39 flows through the branch-pipe 61, the supply valve 62, the distribution piping 60, the header pipe, the pipe 42, the footer pipe 44 and the reformed-fuel pipe 45 in this order. Then, the fuel is injected into the exhaust port 22 through the downstream opening end 45a of the reformed-fuel pipe 45.

Moreover, as shown in FIG. 1, a heat exchanger 46 is provided to the reformed-fuel pipe 45 and the branch pipe 61 in such a manner that the reformed fuel and the fuel of before reforming perform a heat exchange therebetween. That is, the reformed fuel which is heated by the exhaust gas in the reformer 40 is cooled by the fuel of before being reformed. In other words, the fuel of before being reformed is cooled by the reformed fuel.

Furthermore, a part of the reformed-fuel pipe 45 is arranged in the water jacket 20w of the exhaust port 22. Thereby, the reformed fuel and the coolant perform a heat exchange therebetween. That is, the reformed fuel which is heated by the exhaust gas in the reformer 40 is cooled by the coolant flowing through the water jacket 20w.

The supply valve 62 and the fuel injector 37 are operated by an electronic control unit (ECU) 70. Hereafter, a valve-opening-time control of the supply valve 62 will be described, referring to FIG. 3.

Figure 3:
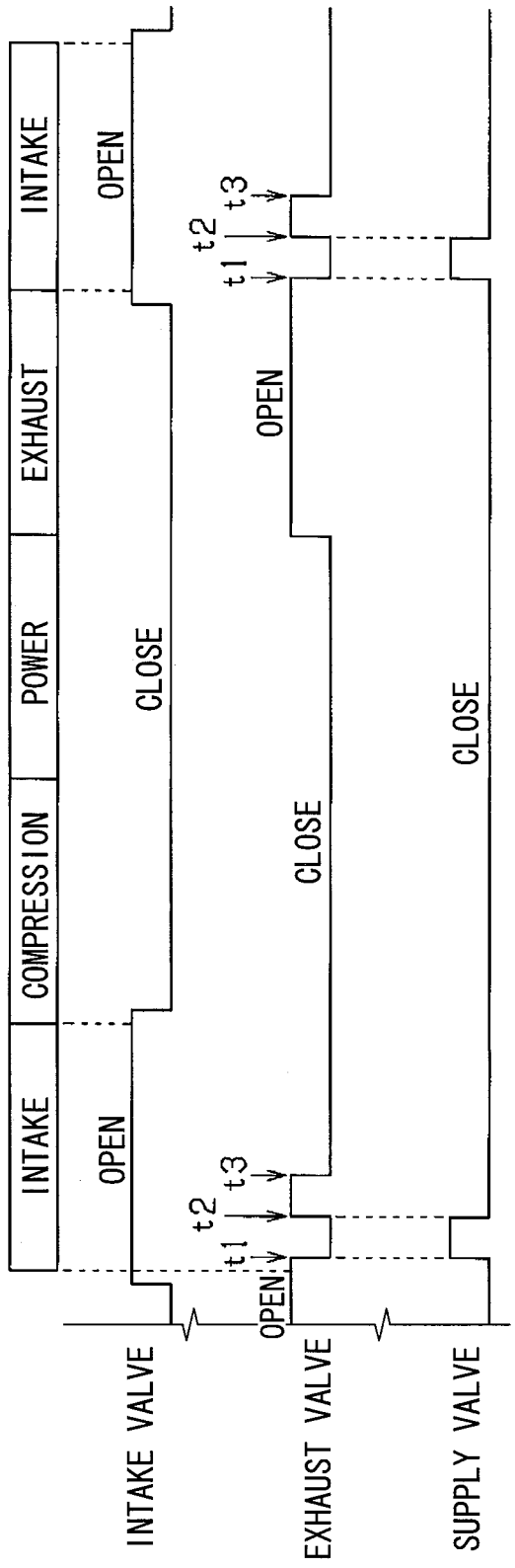
FIG. 3 is a time chart for explaining valve timings of an intake valve, an exhaust valve and a supply valve.

FIG. 3 shows valve timings of the intake valve 31, the exhaust valve 32 and the supply valve 62 in an intake stroke, a compression stroke, a combustion stroke and an exhaust stroke. It should be noted that the intake valve 31 and the exhaust valve 32 are opened and close by a cam provided to a camshaft of the internal combustion engine.

When the exhaust stroke ends at a time of "t1", the exhaust valve 32 is closed. Then, in the intake stroke immediately after the exhaust stroke, the exhaust valve 32 is opened at a time of "t2". Then, the exhaust valve 32 is closed at a time of "t3". That is, the exhaust valve 32 is closed during the exhaust stroke and the intake stroke in one combustion cycle. In a period from "t1" to "t2", the supply valve 62 which supplies the fuel to the reformer 40 is opened.

Figure 4A:
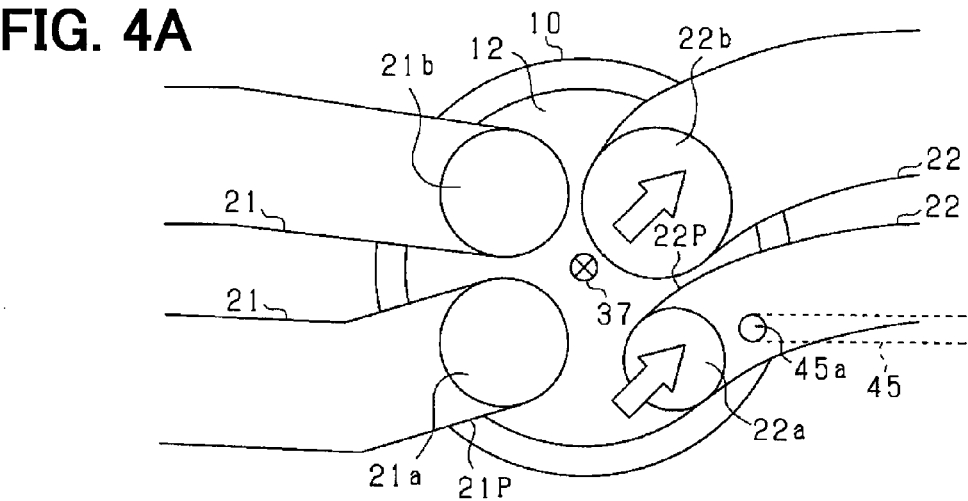
FIG. 4A is a chart showing an exhaust gas flow flowing into an interior of a combustion chamber.
Figure 4B:
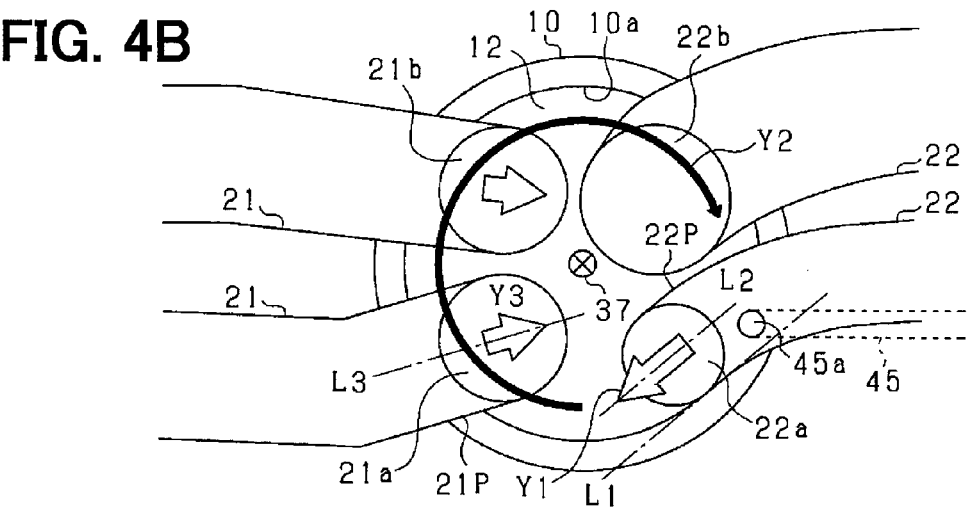
FIG. 4B is a chart showing an intake air flow and a reformed fuel flow which flow into the interior of a combustion chamber.
Figure 4C:
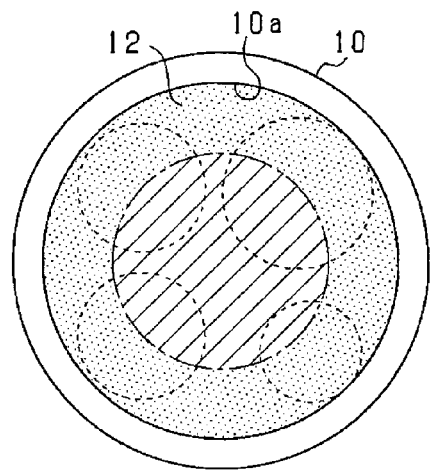
FIG. 4C is a chart showing a distribution of the reformed furl and a non-reformed fuel.

FIGS. 4A to 4C are charts showing a condition of the combustion chamber 12 when each of valves 31, 32, 62 is opened and closed. It should be noted that FIGS. 4A to 4B show a configuration where two intake inlets 21a, 21b and two exhaust outlets 22a, 22b are provided to the cylinder head 20 with respect to one combustion chamber 12. The reformed fuel is not injected from the reformed-fuel pipe 45 to the exhaust port 22 defining the exhaust outlet 22b. Therefore, the exhaust valve 32 which opens and closes the exhaust outlet 22a is opened at the time of "t2" in the intake stroke as shown in FIG. 3. The exhaust valve 32 which opens and closes the exhaust outlet 22b is not opened in the intake stroke.

Therefore, during the exhaust stroke, the exhaust gas is discharged from the two exhaust outlets 22a and 22b as shown by arrows in FIG. 4A. During a period from "t2" to "t3", the reformed fuel flows into the combustion chamber 12 from the exhaust outlet 22a as shown by an arrow "Y1" in FIG. 4B.

It should be noted that the reformed fuel which flows into the combustion chamber 12 through the exhaust outlet 22a flows along an inner circumferential wall 10a of a cylinder, as shown by an arrow "Y2" in FIG. 4B. Meanwhile, the non-reformed fuel injected from the fuel injector 37 is injected toward a center portion of reformed fuel flowing along the inner circumferential wall 10a. Specifically, the fuel injector 37 which injects non-reformed fuel is arranged at an upper center portion of the combustion chamber 12, so that the non-reformed fuel can be injected towards the center of the combustion chamber 12.

Therefore, during the combustion stroke, the combustion of the reformed fuel occurs at a vicinity of the inner circumferential wall 10a of the cylinder (halftone dot hatch-way portion in FIG. 4C). The combustion of the non-reformed fuel occurs at a center portion of the combustion chamber 12 (slash hatch-way portion in FIG. 4C).

A specific configuration in which the reformed fuel flows along the inner circumferential wall 10a will be explained in detail.

In the following description, one of exhaust outlets 22a, 22b through which the reformed fuel flows into the combustion chamber 12 is referred to as a reformed-fuel inlet port 22a, hereinafter. One of exhaust ports 22 which defines a passage for introducing the reformed fuel to the reformed-fuel inlet port 22a is referred to as an introduction port, hereinafter. A long dashed short dashed line L1 in FIG. 4B represents a tangent line which touches the reformed-fuel inlet port 22a.

A part of the introduction port 22 which is adjacent to the reformed-fuel inlet port 22a is formed in such a manner as to extend in a direction of the above tangent line "L1". This portion is denoted by a numeral "22P" in FIG. 4B. According to the above, an inflow direction (an arrow "Y1" in FIG. 4B) in which the reformed fuel flows into the combustion chamber 12 from a reformed-fuel inlet port 22a can be made the same as the tangential direction (long dashed short dashed line "L1" reference in FIG. 4) of the inner circumferential wall 10a. Therefore, it is expedited that the reformed fuel flows along the inner circumferential wall 10a immediately after the reformed fuel flows into the combustion chamber 12 from the reformed-fuel inlet port 22a and collides with the inner circumferential wall 10a. Therefore, the reformed fuel can be annularly distributed along the inner circumferential wall 10a.

When the reformed-fuel inlet port 22a is opened to introduce the reformed fuel into the combustion chamber 12, the other exhaust outlet 22b is closed. Therefore, a speed of the air flow at a vicinity of the reformed-fuel inlet port 22 can be increased more than a case where both exhaust outlets 22a, 22b are opened. Therefore, the reformed fuel can annularly flow along the inner circumferential wall 10a.

A part of the intake port 21 which is adjacent to the intake inlet 21a is formed in such a manner as to be apart from the reformed-fuel inlet port 22a. This portion is denoted by a numeral "21P". That is, the reformed-fuel inlet port 22a is not located on a central line "L3" of the portion 21P of the intake port 21. Therefore, it is avoided that a fresh intake air (an arrow "Y3" in FIG. 4B) which flows into the combustion chamber 12 from the intake inlet 21a collides with the reformed fuel (an arrow "Y1" in FIG. 4B) which has flowed from the reformed-fuel inlet port 22a. Thus, it can be further accelerated that the reformed fuel is annularly distributed along the inner circumferential wall 10a.

Furthermore, a part of the introduction port 22 which is adjacent to the reformed-fuel inlet port 22a is formed in such a manner as to be adjacent to the inner circumferential wall 10a. This portion is denoted by a numeral "22P" in FIG. 4B. Therefore, it can be restricted that that the reformed fuel flowed into the combustion chamber 12 through the reformed-fuel inlet port 22a collides with the inner circumferential wall 10a. It is restricted that a flow velocity of the reformed fuel is decreased. The reformed fuel can annularly flow along the inner circumferential wall 10a with high reliability.

Furthermore, an opening area of the reformed-fuel inlet port 22a is set larger than that of the other exhaust outlet 22b. Thus, the flow velocity of the air at a vicinity of the reformed-fuel inlet port 22a is increased, whereby the reformed fuel can annularly flow along the inner circumferential wall 10a with high reliability.

According to the present embodiment, the alcohol fuel is reformed by the reformer 40. A combustion temperature of the reformed fuel ($CO$, $H_2$) is lower than that of the non-reformed fuel ($CH_3$—$OH$). Since the reformed fuel is annularly distributed along the inner circumferential wall 10a and the non-reformed fuel is distributed at a center of the annularly distributed reformed fuel, the non-reformed fuel is compressed to be self-ignited at the center of the combustion chamber 12 and the reformed fuel is ignited at a vicinity of the inner circumferential wall 10a. That is, the self-ignited combustion with high temperature occurs at a center of the cylinder and the self-ignite combustion with low temperature occurs at a vicinity of the inner circumferential wall 10a.

Therefore, according to present embodiment, a heat loss that the combustion heat is lost to the cylinder block 10 can be reduced more than a case where a self-ignite combustion with high temperature occurs at a vicinity of the inner circumferential wall 10a.

Furthermore, since the reformed fuel is introduced into the combustion chamber 12 through the reformed-fuel inlet port 22a, the reformed fuel is mixed with the exhaust gas of which oxygen concentration is low to be combusted. Therefore, since the combustion-temperature of the reformed fuel can be lowered, the heat loss that the combustion heat is lost to the cylinder block 10 can be restricted. It should be noted that the reformed fuel is combusted at a lean condition of which air-fuel ratio is greater than a stoichiometric ratio and the non-reformed fuel is combusted at the stoichiometric ratio or more. The reformed fuel is established as lean more than the non-reformed fuel.

According to the present embodiment described above, following advantages can be further obtained. That is, since the reformed fuel is injected into the exhaust port 22 and is introduced into the combustion chamber 12 through the reformed-fuel inlet port 22a, the reformed-fuel pipe 45 is arranged at a vicinity of the exhaust manifold 34. Thus, it is restricted that the reformed fuel is cooled in the reformed-fuel pipe 45. Furthermore, since the reformed fuel is not mixed with fresh intake air until the reformed fuel flows into the combustion chamber 12, it can be avoided that the reformed fuel is cooled by the fresh intake air. As described above, even when the fuel supplied to the reformer 40 has low temperature, it is restricted that the reformed fuel is further cooled to deteriorate its ignitionability.

If the temperature of the reformed fuel becomes excessively high by the exhaust gas, the reformed fuel may be self-ignited. According to the present embodiment, in order to avoid such a self-ignition of the reformed fuel, the reformed fuel in the reformed-fuel pipe 45 is cooled by the engine coolant and the fuel which has not been reformed yet. Furthermore, since the fuel which has not been reformed is heated by the reformed fuel in the heat exchanger 46, the reforming efficiency on a catalyst can be improved.

Since the reformer 40 is arranged in the exhaust manifold 34, the temperature of the reformer 40 can be increased greater than the activation temperature by using of the exhaust gas. Thus, the temperature of the catalyst can be easily increased without using any additional heater. The fuel temperature in the reformer 40 can be increased, whereby the reforming efficiency can be improved.

Since the heat insulating material 34a is disposed between the cylinder head 20 and the exhaust manifold 34, the temperature rise of the reformer 40 is accelerated and the reforming efficiency can be improved. It should be noted that the exhaust gas temperature falls by performing a heat exchange with the reformer 40. The temperature of exhaust gas flowing into the purifying device 36 falls. Therefore, even in a case that the heat insulating material 34a is interposed, it can be avoided that the purifying device 36 is overheated to be damaged.

Since the wall 41 defining the exhaust passage 41a is made of ceramics, the reformed 40 can be maintained at high temperature to improve the reforming efficiency.

Since the supply valve 62 is prohibited to be opened during a stroke other than the intake stroke, it can be avoided that the reformed fuel injected to the exhaust port 22 flows out to the exhaust manifold 34 without flowing through the exhaust outlet 22a.

In a period from "t1" to "t2", the supply valve 62 which supplies the fuel to the reformer 40 is opened. Therefore, a time period during which the fuel supplied from the reformer 40 is retained in the fuel passage 42a can be prolonged, whereby the reforming efficiency can be improved. Moreover, a time period from the liquid fuel is supplied from the supply valve 62 until the liquid fuel flows into the exhaust outlet 22a can be prolonged, the liquid fuel can be fully vaporized.

[Second Embodiment]

Figure 5A:
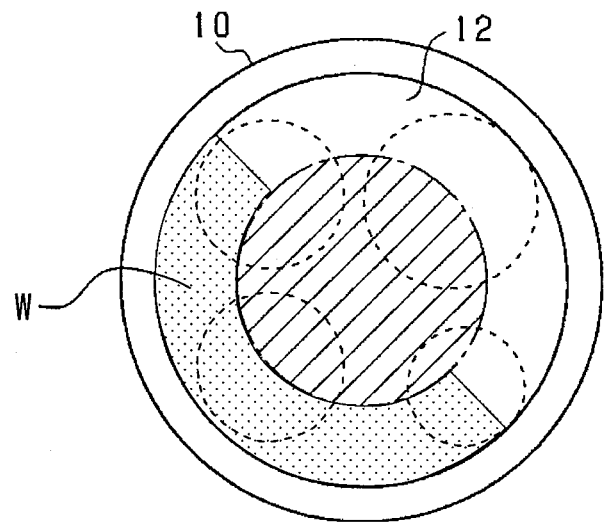
FIGS. 5A and 5B are charts showing a distribution of a combustion according to a second embodiment.

In the above first embodiment, the reformed-fuel inlet port 22a is opened once during the intake stroke, as shown in FIG. 3. If the quantity of the reformed fuel flowing into the combustion chamber 12 is insufficient, the reformed fuel may not be annularly distributed as shown by the halftone dot hatch way "W" in FIG. 5A.

Figure 5B:
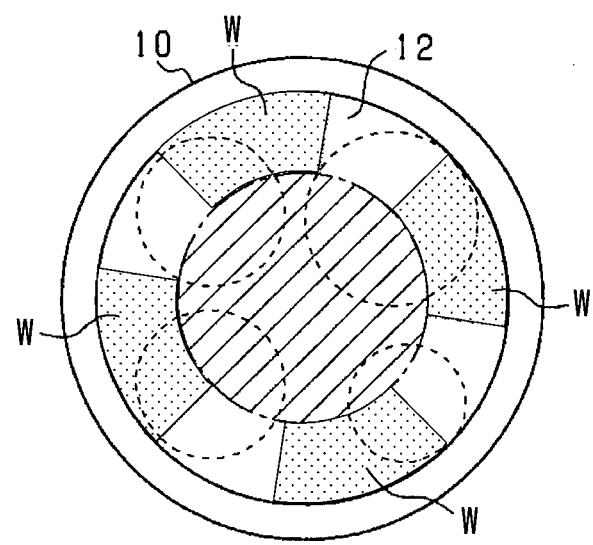

According to a second embodiment, the reformed-fuel inlet port 22a is opened and closed multiple times during one intake stroke. Thus, since the reformed fuel flows into the combustion chamber 12 intermittently, the reformed fuel can be annularly distributed as shown by the halftone dot hatch way "W" in FIG. 5B even if the quantity of the reformed fuel is insufficient. Therefore, the non-reformed fuel can be combusted with high temperature at a position apart from the inner circumferential wall 10a.

[Third Embodiment]

Figure 6:
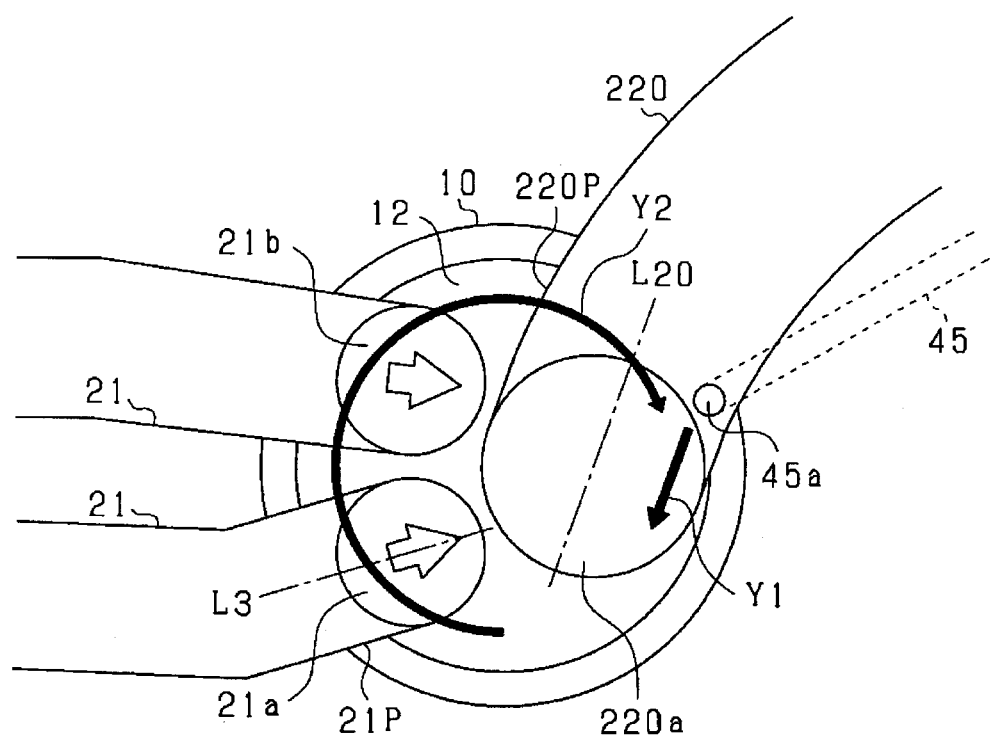
FIG. 6 is a chart schematically showing a combustion system according to a third embodiment.

According to a third embodiment, an internal combustion engine has only one reformed-fuel inlet port 220a, as shown in FIG. 6. A part of the introduction port 220 which is adjacent to the reformed-fuel inlet port 220a is formed in such a manner as to be apart from a center of the combustion chamber 12. This portion is denoted by a numeral "220P" in FIG. 6. In other words, a center line "L20" of the part 220P of the introduction port 220 is apart from the center of the combustion chamber 12.

According to the above, it can be restricted that that the reformed fuel flowed into the combustion chamber 12 through the reformed-fuel inlet port 220a collides with the inner circumferential wall 10a. Thus, it is expedited that the reformed fuel flows along the inner circumferential wall 10a (an arrow "Y2") immediately after the reformed fuel flows into the combustion chamber 12 from the reformed-fuel inlet port 220a (an arrow "Y1") and collides with the inner circumferential wall 10a. Therefore, even though the internal combustion engine has only one reformed-fuel inlet port 220a, the reformed fuel can be annularly distributed along the inner circumferential wall 10a.

Moreover, the downstream opening end 45a of the reformed-fuel pipe 45 is arranged eccentrically relative to the central line "L20". According to the above embodiment, it is accelerated that the reformed fuel flows along the inner circumferential wall 10a.

[Other Embodiment]

The present invention is not limited to the embodiments described above, but may be performed, for example, in the following manner. Further, the characteristic configuration of each embodiment can be combined.

In the above embodiments, the exhaust gas is mixed with the fuel which will be supplied to the reformer 40, whereby water component required for reforming is mixed with the fuel. However, instead of the above, water may be mixed with the fuel previously stored in the fuel tank 38. That is, instead of the alcohol, the alcohol water may be stored in the fuel tank 38. According to this, the reed valve 43b is unnecessary.

Although the reformed fuel is injected into the exhaust port 22 in the above embodiment, the reformed fuel may be injected into the exhaust manifold 34 or the collecting exhaust pipe 35. It is preferable that the reformed fuel is injected into a portion which is closer to the exhaust outlet 22a than the reformer 40. The reformed fuel less remain without being introduced through the exhaust outlet 22a.

Figure 7A:
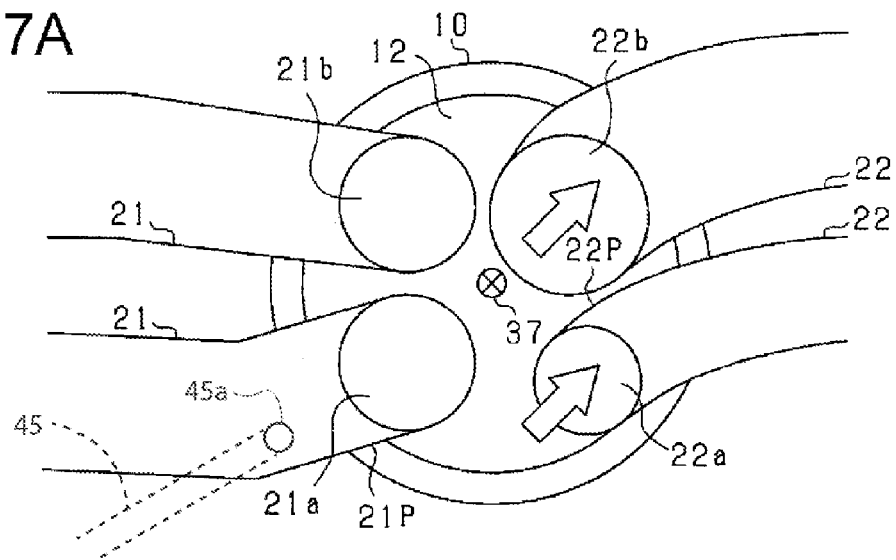
FIGS. 7A and 7B are charts showing an exhaust gas flow flowing into an interior of a combustion chamber and showing an intake air flow and a reformed fuel flow which flow into the interior of a combustion chamber.
Figure 7B:
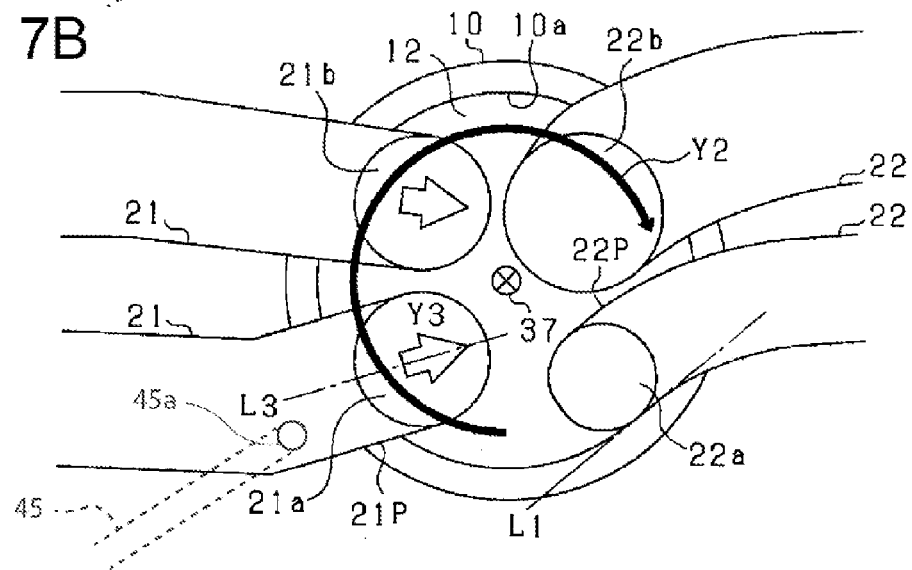

Although the reformed-fuel pipe 45 is connected to the exhaust port 22 and the reformed fuel flows through the exhaust outlet 22a, 220a in the above embodiments, the reformed-fuel pipe 45 may be connected to the intake port 21 and the reformed fuel may be introduced through the intake inlet 21a, as illustrated in FIGS. 7A and 7B. In this case, it is preferable to adjust the injection quantity of the reformed fuel so that the reformed fuel is combusted in a lean condition.

Although the reformed-fuel pipe 45 is connected to the exhaust port 22 and the reformed fuel flows through the exhaust outlet 22a, 220a in the above embodiments, the reformed-fuel pipe 45 may be connected to the combustion chamber 12 and the reformed fuel may be directly introduced into the combustion chamber 12.

Although the reformer 40 is arranged inside of the exhaust manifold 34 in the above embodiments, the reformer 40 may be arranged inside of the collecting exhaust pipe 35. In this case, only one reformer 40 is necessary. Moreover, the reformer 40 may be arranged outside of the exhaust pipe 34, 35.

The above described combustion system can be applied to an internal combustion engine mounted to an automobile. In this case, when the engine is started in a cold state, it is preferable that the reformed fuel in the reformed-fuel pipe 45 is less cooled by the coolant so as not to deteriorate the ignitionability. For example, an electromotive water pump 30 is employed. The water pump 30 is turned off when the engine is started in the cold state. Alternatively, the discharge amount of the water pump 30 is reduced.

Also, in a case that a mechanical water pump 30 is employed, the rotating speed of the water pump 30 is relatively low since the engine speed is also low in the cold state. Thus, the circulating flowing quantity of the coolant also decreases and the reformed fuel is less cooled by the coolant. A deterioration in ignitionability can be reduced.

Although one supply valve 62 is provided to multiple reformers 40 in the above embodiment, the supply valve 62 may be provided to every reformer 40. According to this, the reforming efficiency is improved and the vaporization of a liquid fuel is expedited.

Regarding the exhaust valve, an open-valve lift amount in an exhaust stroke and an open-valve lift amount in an intake stroke are established equal to each other in the above embodiments. However, the open-valve lift amount in an intake stroke may be made larger than the open-valve lift amount in an exhaust stroke. According to this configuration, since a flow velocity of the reformed fuel through the exhaust outlet 22a can be made higher, it is avoided that the reformed fuel injected into the exhaust port 22 remains in the exhaust port 22 without flowing through the exhaust outlet 22a. In the above described embodiments, the fuel injector 37 and the reformed-fuel pipe 45 correspond to an injection unit for injecting the reformed fuel and the non-reformed fuel.

What is claimed is:

1. A combustion system comprising:
   a reformer which reforms a fuel on a catalyst so as to increase a combustion energy generated by the fuel per unit quantity of the fuel; and
   an injection unit which injects a reformed fuel and a non-reformed fuel in such a manner that the reformed fuel is annularly distributed along an inner circumferential wall of a cylinder of an internal combustion engine and the non-reformed fuel is distributed inside of the annularly distributed reformed fuel, wherein:
   the reformed fuel and the non-reformed fuel are combusted in a combustion chamber of the internal combustion engine at a substantially same time,
   the non-reformed fuel is compressed self-ignited to be combusted and the reformed fuel is ignited by a combustion of the non-reformed fuel,
   the reformed fuel is introduced into the combustion chamber through an exhaust outlet or an intake inlet during an intake stroke of the internal combustion engine, the exhaust outlet being opened and closed by an exhaust valve, the intake inlet being opened and closed by an intake valve,
   one of the exhaust outlet and the intake inlet through which the reformed fuel flows is referred to as a reformed-fuel inlet port; and
   an engine control unit configured to cause the reformed-fuel inlet port to be opened and closed multiple times during one intake stroke.

2. A combustion system according to claim 1, wherein:
   one of the exhaust outlet and the intake inlet through which the reformed fuel flows is referred to as a reformed-fuel inlet port; one of the exhaust outlet and the intake inlet which defines a passage for introducing the reformed fuel to the reformed-fuel inlet port is referred to as an introduction port; and
   a portion of the introduction port which is adjacent to the reformed-fuel inlet port is formed to extend in a tangential direction with respect to the inner circumferential wall of the cylinder.

3. A combustion system according to claim 1, wherein:
   the reformed fuel is injected into an exhaust passage so that the reformed fuel flows into the combustion chamber through the exhaust outlet.

4. A combustion system according to claim 3, wherein:
   the internal combustion engine has a plurality of exhaust outlets with respect to one combustion chamber, and the engine control unit being configured to cause only one of the exhaust outlets to open when the reformed fuel flows into the combustion chamber.

5. A combustion system according to claim 1, wherein:
   one of the exhaust outlet and the intake inlet through which the reformed fuel flows is referred to as a reformed-fuel inlet port;
   one of the exhaust outlet and the intake inlet which defines a passage for introducing the reformed fuel to the intake inlet is referred to as an intake port; and
   a portion of the intake port which is adjacent to the intake inlet is formed to extend in such a manner as to be apart from the reformed-fuel inlet port.

6. A combustion system comprising:
   a reformer which is arranged in an exhaust pipe of the internal combustion engine for reforming a fuel on a catalyst;
   an injection unit which injects a reformed fuel into an exhaust passage of an internal combustion engine; and
   a supply valve which opens and closes a passage for introducing the fuel into the reformer, wherein:
   the reformer has an inlet port through which a part of an exhaust gas discharged from a combustion chamber of the internal combustion engine to an exhaust passage flows into the reformer;
   the fuel which flows into the reformer is mixed with an exhaust gas before the fuel is reformed; and
   the reformed fuel in the exhaust passage flows into a combustion chamber through an exhaust outlet which is opened and closed by an exhaust valve; and
   an engine control unit configured to:
   cause the supply valve to open the passage when the internal combustion engine is in an intake stroke;
   cause the exhaust valve to close when an exhaust stroke ends;
   cause the exhaust valve to open when a successive intake stroke starts; and
   cause the supply valve to open the passage to supply the fuel during a period from when the exhaust valve is closed until when the exhaust valve is opened.

7. A combustion system according to claim 6, wherein:
   the fuel which flows into the reformer performs a heat exchange with the fuel which has been reformed by the reformer.

8. A combustion system according to claim 6, wherein:
   a heat insulating material is disposed between a cylinder head defining the combustion chamber and the exhaust pipe.

9. A method for controlling valve timings in a combustion system comprising:
   a reformer which reforms a fuel on a catalyst so as to increase a combustion energy generated by the fuel per unit quantity of the fuel; and
   an injection unit which injects a reformed fuel and a non-reformed fuel in such a manner that the reformed fuel is annularly distributed along an inner circumferential wall of a cylinder of an internal combustion engine and the non-reformed fuel is distributed inside of the annularly distributed reformed fuel,
   the method comprising:
   combusting the reformed fuel and the non-reformed fuel in a combustion chamber of the internal combustion engine at a substantially same time, wherein the non-reformed fuel is compressed self-ignited to be combusted and the reformed fuel is ignited by a combustion of the non-reformed fuel, introducing the reformed fuel into the combustion chamber through an exhaust outlet or an intake inlet during an intake stroke of the internal combustion engine, the exhaust outlet being opened and closed by an exhaust valve, the intake inlet being opened and closed by an intake valve, wherein one of the exhaust outlet and the intake inlet through which the reformed fuel flows is referred to as a reformed-fuel inlet port; and opening and closing the reformed-fuel inlet port multiple times during one intake stroke.

10. A method for controlling valve timings in a combustion system according to claim 9, wherein the internal combustion engine has a plurality of exhaust outlets with respect to one combustion chamber, the method further comprising opening only one of the exhaust outlets when the reformed fuel flows into the combustion chamber.

* * * * *